US012359007B2

(12) United States Patent
Kono et al.

(10) Patent No.: US 12,359,007 B2
(45) Date of Patent: Jul. 15, 2025

(54) MODIFIED POLYOLEFIN RESIN COMPOSITION

(71) Applicant: NIPPON PAPER INDUSTRIES CO., LTD., Kita-ku (JP)

(72) Inventors: Masaru Kono, Tokyo (JP); Hitomi Abe, Tokyo (JP); Minoru Yada, Tokyo (JP); Naosuke Komoto, Tokyo (JP)

(73) Assignee: NIPPON PAPER INDUSTRIES CO., LTD., Kita-ku (JP)

(*) Notice: Subject to any disclaimer, the term of this patent is extended or adjusted under 35 U.S.C. 154(b) by 826 days.

(21) Appl. No.: 17/603,032

(22) PCT Filed: Apr. 10, 2020

(86) PCT No.: PCT/JP2020/016126
§ 371 (c)(1),
(2) Date: Oct. 12, 2021

(87) PCT Pub. No.: WO2020/213528
PCT Pub. Date: Oct. 22, 2020

(65) Prior Publication Data
US 2022/0195084 A1 Jun. 23, 2022

(30) Foreign Application Priority Data
Apr. 17, 2019 (JP) .................. 2019-078866

(51) Int. Cl.
C09D 11/108 (2014.01)
C08F 210/06 (2006.01)
C09D 5/00 (2006.01)
C09D 123/30 (2006.01)

(52) U.S. Cl.
CPC ............ *C08F 210/06* (2013.01); *C09D 5/002* (2013.01); *C09D 11/108* (2013.01); *C09D 123/30* (2013.01); C08F 2800/20 (2013.01); C08F 2810/00 (2013.01)

(58) Field of Classification Search
CPC .. C08L 51/06; C08L 23/28; C08F 8/46; C08F 8/20; C08F 8/14
See application file for complete search history.

(56) References Cited

U.S. PATENT DOCUMENTS

| | | | |
|---|---|---|---|
| 4,619,969 A | 10/1986 | Doi et al. | |
| 4,997,882 A | 3/1991 | Martz et al. | |
| 5,525,672 A | 6/1996 | Jones | |
| 8,519,046 B2 | 8/2013 | Hirose et al. | |
| 2006/0074181 A1 | 4/2006 | Eagan et al. | |
| 2010/0029836 A1 | 2/2010 | Hirose et al. | |
| 2011/0112229 A1 | 5/2011 | Nagaoka et al. | |

FOREIGN PATENT DOCUMENTS

| | | |
|---|---|---|
| CN | 101589101 A | 11/2009 |
| CN | 102124062 A | 7/2011 |
| EP | 0 558 001 A1 | 9/1993 |
| EP | 3 805 274 A1 | 4/2021 |
| JP | 61-111346 A | 5/1986 |
| JP | 3-115476 A | 5/1991 |
| JP | 04-288336 A | 10/1992 |
| JP | 6-145286 A | 5/1994 |
| JP | 2004-114610 A | 4/2004 |
| JP | 2008-516053 A | 5/2008 |
| JP | 2015-3991 A | 1/2015 |
| WO | WO 2008/072689 A1 | 6/2008 |
| WO | WO 2019/235359 A1 | 12/2019 |

OTHER PUBLICATIONS

Combined Taiwanese Office Action and Search Report issued Aug. 8, 2023, in corresponding Taiwanese Patent Application No. 109112753 (with English Translation of Category of Cited Documents) 6 pages.
Combined Chinese Office Action and Search Report issued Aug. 31, 2023, in corresponding Chinese Patent Application No. 202080029332.6 (with English Translation of Category of Cited Documents) 13 pages.
"Plastic Extrusion Production Process Manual", #31824023v1, Jun. 30, 2014, pp. 208-209.
"Application Progress of Extrusion Processing Technology of . . . ", #31824014v1, Jan. 31, 2002, pp. 362.
"Synthetic Resin and Plastic Grade Manual", #31824021v1, Oct. 31, 2000, pp. 302-303.
"Fine Processing Research", #31824022v1, Apr. 30, 1998, pp. 254.
Extended European Search Report issued on Nov. 16, 2022 in European Patent Application No. 20790918,5, 14 pages.
International Search Report mailed on Jul. 7, 2020 in PCT/JP2020/016126 filed on Apr. 10, 2020 (2 pages).
Japanese Notice of Reasons for Refusal issued Aug. 6, 2024 in Japanese Patent Application No. 2021-514924, 9 pgs.

*Primary Examiner* — Catherine S Branch
*Assistant Examiner* — Huihong Qiao
(74) *Attorney, Agent, or Firm* — Oblon, McClelland, Maier & Neustadt, L.L.P.

(57) ABSTRACT

A modified polyolefin resin composition may include a modified polyolefin resin (X) formed by modifying an acid-modified polyolefin resin (A) with a modification component comprising an alcohol (B), in which the modified polyolefin resin composition satisfies (I) to (III): (I) the resin (A) is a resin formed by modifying a polyolefin (a) with an α,β-unsaturated carboxylic acid and a derivative (b) of the α,β-unsaturated carboxylic acid having a structure (b1) derived from at least one carboxy group; (II) a residual ratio of the structure (b1) in the resin (X) is more than 0% to 50% or less; and (III) a content of the alcohol in the composition is 1.0 mol to 5.0 mol relative to 1.0 mol of the structure (b1) that the resin (A) has.

20 Claims, No Drawings

MODIFIED POLYOLEFIN RESIN COMPOSITION

CROSS-REFERENCE TO RELATED APPLICATIONS

The present application is the national stage of international application PCT/JP2020/01 6126, filed on Apr. 10, 2020, and claims the benefit of the filing date of Japanese Appl. No. 2019-078866, filed on Apr. 17, 2019.

FIELD

The present invention relates to a modified polyolefin resin composition and in particular relates to a modified polyolefin composition, use thereof, and a method for producing the same.

BACKGROUND

Polyolefin substrates have many advantages such as low cost, light weight, and easy processing and are widely used as substrates for various products such as automobiles and food packaging. Examples of the problems of the polyolefin substrate include low adhesion to paints and inks due to low surface free energy. When a modified polyolefin resin is used as an effective component of the paints, an acid-modified polyolefin resin is widely used in order to improve paint-applicability onto the polyolefin substrates. Acid modification treatment that modifies a polyolefin with an acid component allows an acid component group to be grafted onto the polyolefin chain. As a result, the acid-modified polyolefin resin exhibits excellent affinity with paints and the adherability between the substrate and the paint can be secured. The acid modification treatment with maleic anhydride is usually performed by extrusion modification using an extruder or solution modification performed in a solution, both of which can be performed easily and inexpensively. Therefore, the acid-modified polyolefin resin is widely used (for example, Patent Literature 1).

CITATION LIST

Patent Literature

Patent Literature 1: Japanese Patent Application Laid-open No. 2004-114610

SUMMARY

Technical Problem

As one of the problems that the acid-modified polyolefin resin has, thickening in the solution observed when the dispersion liquid (or the solution) of the acid-modified polyolefin resin is allowed to stand for a long period of time may be exemplified. In particular, mixing of a substance containing a hydroxy group or a substance containing a hydroxy group equivalent structure with the dispersion liquid including the acid-modified polyolefin resin causes significant thickening in the dispersion liquid. It is considered that the acid component group in the acid-modified polyolefin resin reacts with the hydroxy group to form a crosslinked structure. The thickening of the dispersion liquid causes difficulty in a blending operation of the dispersion liquid into the paint and an application operation to the substrate and thus the dispersion liquid becomes unsuitable for practical use. Attempts have been made to reduce the thickening of the dispersion liquid. However, any of these attempts has problems of, for example, not allowing the adherability to the substrate to be secured, or not allowing the thickening in storage at a high temperature and for a long period of time to be prevented.

An object of the present invention is to provide a modified polyolefin resin composition including an acid-modified polyolefin resin that has excellent storage stability at high temperature and for a long period of time while securing excellent adherability (an adhesion property) to a substrate.

Solution to Problem

The present invention provides the following.

[1] A modified polyolefin resin composition comprising:
a modified polyolefin resin (X) formed by modifying an acid-modified polyolefin resin (A) with a modification component comprising an alcohol (B), wherein
the modified polyolefin resin composition satisfies following (I) to (III):
  (I) the acid-modified polyolefin resin (A) is a resin formed by modifying a polyolefin (a) with an $\alpha$, $\beta$-unsaturated carboxylic acid and a derivative (b) of the $\alpha$, $\beta$-unsaturated carboxylic acid having a structure (b1) derived from at least one carboxy group;
  (II) a residual ratio of the structure (b1) in the modified polyolefin resin (X) is more than 0% to 50% or less; and
  (III) a content of the alcohol in the composition is 1.0 mol to 5.0 mol relative to 1.0 mol of the structure (b1) that the acid-modified polyolefin resin (A) has.

[2] The modified polyolefin resin composition according to [1], wherein the structure (b1) is a group represented by $$-(C=O)-O-(C=O)-  \quad \text{Formula (1)}$$

[3] The modified polyolefin resin composition according to [1] or [2], wherein the $\alpha,\beta$-unsaturated carboxylic acid and the derivative (b) of the $\alpha,\beta$-unsaturated carboxylic acid are an $\alpha,\beta$-unsaturated polycarboxylic acid cyclic anhydride.

[4] The modified polyolefin resin composition according to any one of [1] to [3], wherein the modified polyolefin resin (X) is a modified chlorinated polyolefin resin (X1).

[5] The modified polyolefin resin composition according to any one of [1] to [4], wherein the acid-modified polyolefin resin (A) is an acid-modified chlorinated polyolefin resin (A1).

[6] The modified polyolefin resin composition according to any one of [1] to [5], further comprising a substance (D) having a hydroxy group or a hydroxy group equivalent structure.

[7] The modified polyolefin resin composition according to any one of [1] to [6], wherein the alcohol (B) at least comprises an alcohol having a number of carbon atoms of 2 to 4.

[8] The modified polyolefin resin composition according to any one of [1] to [7], wherein the alcohol (B) at least comprises a primary alcohol.

[9] The modified polyolefin resin composition according to any one of [1] to [8], further comprising an organic solvent (C).

[10] The modified polyolefin resin composition according to any one of [1] to [9], wherein a content of the $\alpha,\beta$-unsaturated carboxylic acid and the derivative (b) of the $\alpha,\beta$-unsaturated carboxylic acid in the acid-modified polyolefin resin (A) is 0.5% by weight to 20% by weight.

[11] The modified polyolefin resin composition according to any one of [1] to [10], wherein a weight average molecular weight of the acid-modified polyolefin resin (A) is 5,000 to 300,000.

[12] A primer comprising the modified polyolefin resin composition according to any one of [1] to [11].

[13] A paint comprising the modified polyolefin resin composition according to any one of [1] to [11].

[14] An ink comprising the modified polyolefin resin composition according to any one of [1] to [11].

[15] A method for producing the modified polyolefin resin composition according to any one of [1] to [11], the method at least comprising:

modifying the polyolefin (a) with the α,β-unsaturated carboxylic acid and the derivative (b) of the α,β-unsaturated carboxylic acid having the structure (b1) derived from at least one carboxy group to give the acid-modified polyolefin resin (A); and modifying the acid-modified polyolefin resin (A) with the modification component comprising the alcohol (B) in an amount of 1.0 to 5.0 mol relative to 1.0 mol of the structure (b1) that the acid-modified polyolefin resin (A) has to give the modified polyolefin resin (X).

Advantageous Effects of Invention

The modified polyolefin resin composition according to the present invention has excellent storage stability at high temperature and for a long period of time while securing the excellent adherability to a substrate of a non-polar resin such as a polyolefin resin. In addition, the modified polyolefin resin composition according to the present invention can reduce thickening even after storage at a high temperature and for a long period of time in the presence of a substance containing a hydroxy group or a hydroxy group equivalent structure and can exhibit excellent adherability, pigment dispersibility, and hue stability.

DESCRIPTION OF EMBODIMENTS

The modified polyolefin resin composition includes a modified polyolefin resin (X). The modified polyolefin resin (X) is a resin obtained by modifying the acid-modified polyolefin resin (A) with an alcohol (B).

[Acid-Modified Polyolefin Resin (A)]

The acid-modified polyolefin resin (A) (hereinafter, may be referred to as the "resin (A)") is an acid-modified polyolefin resin formed by graft-modifying the polyolefin (a) with the α,β-unsaturated carboxylic acid and the derivative (b) thereof (hereinafter, may be referred to as the "acid component (b)") (Condition (I)) and has the structure derived from the polyolefin (a) and the structure derived from the acid component (b). The resin (A) may be a single acid-modified polyolefin resin or a combination of two or more of the acid-modified polyolefin resins. In the present specification, the acid-modified polyolefin resin may be an acid-modified chlorinated polyolefin resin or an acid-modified non-chlorinated polyolefin resin.

(Polyolefin (a))

The polyolefin (a) may be a polymer of olefin. Polymerization catalysts used for the polymerization of the olefin is not particularly limited and is preferably Ziegler-Natta catalyst or a metallocene catalyst. Use of the metallocene catalyst allows the polyolefin (a) having characteristics such as a narrow molecular weight distribution, excellent random copolymerizability, a narrow composition distribution, and a wide range of copolymers that can be copolymerized to be obtained. As the metallocene catalyst, known catalysts can be used. Examples of the metallocene catalyst include catalysts obtained by combining the following components (1) and (2) and further, if necessary, component (3). Of the catalysts, the metallocene catalyst is preferably a catalyst obtained by combining the following components (1) and (2), and further, if necessary, component (3).

Component (1): A metallocene complex that is a transition metal compound of Groups 4 to 6 of the Periodic Table having at least one conjugated five-membered ring ligand.

Component (2): Ion-exchangeable layered silicate.

Component (3): An organoaluminum compound.

Examples of the polyolefin (a) include a polypropylene resin and a propylene-based copolymer (random copolymer and block copolymer) obtained by copolymerizing propylene and a-olefin (for example, ethylene, butene, 3-methyl-1-butene, and 3-methyl-l-heptene). The polyolefin (a) is preferably a propylene-based copolymer (in particular a random copolymer) obtained by using the metallocene catalyst, more preferably a polypropylene resin, an ethylene-propylene copolymer, a propylene-butene copolymer, or an ethylene-propylene-butene copolymer (in particular a random copolymer) obtained by using the metallocene catalyst, and further preferably an ethylene-propylene copolymer (in particular a random copolymer).

The propylene structural unit content ratio in the polyolefin (a) is preferably 60% by weight or more, more preferably 70% by weight or more, and further preferably 80% by weight or more. The propylene structural unit content ratio in the polyolefin (a) may be the ratio of raw materials used or may be a value calculated by NMR analysis. Usually, both values are agreed with each other.

The structure of the polyolefin (a) may be any structure of an isotactic structure, an atactic structure, and a syndiotactic structure that can be formed in common polymer compounds. Polyolefins having the isotactic structure are preferable. Polyolefins obtained using metallocene catalysts usually have the isotactic structure.

The polyolefin (a) may be a single polyolefin (a) alone or a combination of the polyolefins (a).

(Acid Component (b))

The acid-modified polyolefin resin (A) can be obtained by graft-modifying the polyolefin (a) with the acid component (b). The acid-modified polyolefin resin (A) contains the structure derived from the acid component (b), whereby the modified polyolefin resin composition exhibits better adherability, solution stability, pigment dispersibility, and hue stability. As described above, the acid component (b) is the α,β-unsaturated carboxylic acid and the derivative thereof.

The α,β-unsaturated carboxylic acid and the derivative thereof have a structure (b1) derived from at least one carboxy group (hereinafter, also referred to as the "structure (b1)"). Examples of the structure (b1) include substituents such as an amino group, a sulfonic acid group, and a carboxy group and structures derived from these substituents. The structure (b1) is preferably a structure derived from two or more carboxy groups, more preferably a divalent group in which two or more carboxy groups are condensed, and further preferably a group represented by Formula (1):

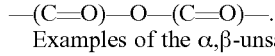
—(C=O)—O—(C=O)—.

Examples of the α,β-unsaturated carboxylic acid and the derivative thereof having the structure (b1) include maleic anhydride, citraconic anhydride, itaconic anhydride, aconite anhydride, maleic acid, citraconic acid, itaconic acid, aconitic acid, (meth)acrylonitrile, (meth) acrylamide, N,N-dimethylaminoethyl (meth) acrylate, N,N-diethylaminoethyl (meth) acrylate, N,N-dimethylaminopropyl (meth) acrylamide, methylenebis(meth)acrylamide, ethylenebis(meth)acrylamide, dimethylaminoethyl (meth)acrylate, an adduct of glycidyl (meth)acrylate and amines, and a polymerizable unsaturated monomer having a sulfonic acid group. Of these compounds, maleic anhydride, aconitic anhydride, and itaconic anhydride are preferable and maleic anhydride is more preferable.

The acid component (b) may be a compound selected from a single α,β-unsaturated carboxylic acid and the derivative thereof alone or a combination of two or more of the a,p-unsaturated carboxylic acids and the derivatives thereof. Examples of the combination of two or more of the α,β-unsaturated carboxylic acids and the derivatives thereof include any of a combination of one or more of the α,β-unsaturated carboxylic acids and one or more of the derivatives thereof, a combination of two or more of the α,β-unsaturated carboxylic acids, and the combination of two or more of the derivatives of the α,β-unsaturated carboxylic acids.

(Content Ratio (Content) of Acid Component (b))

The content ratio of the acid component (b) (the ratio (% by weight) of the content of the acid component (b) relative to the content of the resin (A); a graft weight) is preferably 0.5% by weight or more, more preferably 1.0% by weight or more, and further preferably 2.0% by weight or more. The upper limit is preferably 20.0% by weight or less and more preferably 15.0% by weight or less. Therefore, the content ratio of the acid component (b) is preferably 0.5% by weight to 20% by weight, more preferably 1.0% by weight to 20.0% by weight, and further preferably 2.0% by weight to 15.0% by weight. This may allow the adherability to the substrate to be improved. The content of the acid component (b) can be measured using an alkaline titration method in accordance with the method according to JIS K 0070: 1992.

(Method for Producing Resin (A))

The method for producing the resin (A) is not particularly limited as long as the method includes at least the modification of the polyolefin (a) with the acid component (b). Examples of the method include a method of graft-modifying the polyolefin (a) with the acid component (b) and the method is preferably a method of radically reacting the polyolefin (a) with the acid component (b) in the presence of a radical generator.

(Radical Generator)

The radical generator may be appropriately selected from known radical generators and organic peroxide-based compounds are preferable. Examples of the organic peroxide compound include di-t-butyl peroxide, dicumyl peroxide, t-butylcumyl peroxide, benzoyl peroxide, dilauryl peroxide, cumene hydroperoxide, t-butyl hydroperoxide, 1,4-bis[(t-butylperoxy) isopropyl]benzene, 1,1-bis(t-butylperoxy)-3,5,5-trimethylcyclohexane, 1,1-bis(t-butylperoxy)-cyclohexane, cyclohexanone peroxide, t-butyl peroxybenzoate, t-butyl peroxyisobutyrate, t-butyl peroxy-3,5,5-trimethylhexanoate, t-butyl peroxy-2-ethylhexanoate, t-butyl peroxyisopropyl carbonate, and cumylperoxyoctoate. Of these organic peroxides, di-t-butyl peroxide, dicumyl peroxide, and dilauryl peroxide are preferable.

The radical generator may be a single radical generator alone or a combination of the radical generators.

The amount of the radical generator used is preferably 0.1% by weight or more and more preferably 1% by weight or more relative to the total (weight) of the polyolefin (a). This allows sufficient graft efficiency to be retained. The upper limit is usually 100% by weight or less and preferably 50% by weight or less. This allows a decrease in the weight average molecular weight of the polyolefin (a) to be prevented. Therefore, the amount of the radical generator used is preferably 0.1% by weight to 100% by weight and more preferably 1% by weight to 50% by weight.

(Weight Average Molecular Weight of Resin (A))

The weight average molecular weight of the resin (A) is preferably 5,000 or more, more preferably 7,000 or more, further preferably 10,000 or more, and further more preferably 30,000 or more or 50,000 or more. The upper limit is preferably 300,000 or less, more preferably 250,000 or less, further preferably 200,000 or less, and further more preferably 150,000 or less or 120,000 or less. Therefore, the weight average molecular weight of the resin (A) is preferably 5,000 to 300,000, more preferably 7,000 to 250,000, further preferably 10,000 to 200,000, further more preferably 30,000 to 150,000, and particularly preferably 50,000 to 150,000. This may allow the solution properties when the modified polyolefin resin composition is dispersed in an organic solvent to be improved and the adherability to the substrate to be improved.

The weight average molecular weight can be determined from a standard polystyrene calibration curve by a gel permeation chromatography (GPC) method. The measurement conditions of GPC are described below.

Equipment: HLC-8320GPC (manufactured by TOSOH CORPORATION)

Columns: TSK-gel G-6000 H×L, G-5000 H×L, G-4000 H×L, G-3000 H×L, and G-2000 H×L (manufactured by TOSOH CORPORATION)

Eluent: THF

Flow rate: 1 mL/min

Temperature: 40° C. in pump oven and column oven

Injection volume: 100 μL

Standard substance: Polystyrene EasiCal PS-1 (manufactured by Agilent Technologies Co., Ltd.)

[Modification Component Including Alcohol (B)]

(Alcohol (B))

The alcohol (B) is one of the modification components at the time of obtaining the modified polyolefin resin (X) from the acid-modified polyolefin resin (A). It is presumed that action of the alcohol (B) on the acid-modified polyolefin resin (A) allows the structure (b1) in the resin (A) to be converted into a more stable structure (for example, conversion into ester in the case where the structure (b1) is a group represented by Formula (1)).

The alcohol preferably has a number of carbon atoms of 2 to 4 and/or is a primary alcohol. This allows the reactivity of the acid component (b) grafted on the resin (A) and the alcohol (B) to be improved and an increase in the molecular weight over time to be prevented. As a result, the thickening reduction effect can be sufficiently exhibited. It is presumed that the effect of improving the reactivity between the acid component (b) and the alcohol (B) is achieved because the bulkiness of the alcohol molecule becomes smaller and the alcohol molecule becomes easier to approach the acid component (b) grafted on the resin. Examples of the alcohol include ethanol, 1-propanol, and 1-butanol. The alcohol (B) may be a single alcohol alone or a combination of two or more of the alcohols.

The alcohol (B) can enhance the storage stability of the modified polyolefin resin composition (preferably in the case of the form of a dispersion liquid including an organic solvent). The mechanism is presumed as follows. When the resin (A) is dispersed in the organic solvent to give a dispersion liquid and the alcohol (B) is added to the obtained dispersion liquid, the acid component (b) and the alcohol (B) react to form an ester structure. Therefore, it is presumed that the interaction between the acid components (b) in the dispersion liquid can be inhibited and that the association of the resin components can be reduced. In the case where the dispersion liquid further includes the substance (D) containing a hydroxy group, it is presumed that the reaction between the acid component (b) and the hydroxy group can be inhibited and that the formation of a crosslinked structure can be reduced.

(Content of Alcohol (B))

The content of the alcohol (B) (the amount relative to 1 mol of the structure (b1)) in the modified polyolefin resin composition is preferably 1.0 mol or more, more preferably 1.2 mol or more, and further preferably 1.3 mol or more. The upper limit is preferably 5.0 mol or less, more preferably 4.9 mol or less, and further preferably 4.5 mol or less or 4.0 mol or less. Therefore, the content of the alcohol (B) is preferably 1.0 mol to 5.0 mol (condition (III)), more preferably 1.2 mol to 4.9 mol, further preferably 1.2 mol to 4.5 mol, and further more preferably 1.3 mol to 4.0 mol. This allows the storage stability of the dispersion liquid to be improved and the modified polyolefin resin to be excellently dispersed in the dispersion liquid. The content of the alcohol (B) corresponds to the amount of alcohol added at the time of modifying the resin (A). Therefore, the amount of unreacted alcohol that may be included in the modified polyolefin resin composition is also included in the above content.

(Modification Components Other than Alcohol)

Examples of the modification component other than the alcohol (B) include α,β-unsaturated carboxylic acid (for example, acrylic acid, methacrylic acid, maleic acid, citraconic acid, fumaric acid, mesaconic acid, itaconic acid, and aconitic acid), (meta)acrylates, (meth)acrylonitrile, vinyl group-containing monomers (for example, styrene and vinyl acetate), and macromonomers having polymerizable (meth)acryloyl groups at the ends of polystyrene or poly(meth)acrylate. The modification component other than the alcohol (B) may include the acid component (b).

(Method of Modifying with Modification Component including Alcohol (B))

Examples of the method of modifying the resin (A) with the modifying component including the alcohol (B) include a method in which the resin (A) and the modification component including the alcohol (B) are simultaneously or sequentially dispersed or dissolved in a solvent (for example, the organic solvent (C)) to react. The conditions at the time of the modification are not particularly limited.

[Residual Ratio of Structure (b1)]

The residual ratio of the structure (b1) in the modified polyolefin resin (X) refers to the ratio of the amount of the structure (b1) in the modified polyolefin resin (X) relative to the amount of the structure (b1) in the acid-modified polyolefin resin (A). The residual ratio is a value indicating how much of the structure (b1) before the modification with the modification component including the alcohol (B) remains after the modification.

The residual ratio of the structure (b1) in the modified polyolefin resin (X) is usually 50% or less (Condition (II)), preferably 45% or less, more preferably 40% or less, and further preferably 30% or less. The lower limit of the residual ratio is usually more than 0%, preferably 2% or more, more preferably 5% or more, and further preferably 10% or more. The modified polyolefin resin (X) having the residual ratio within the above range allows the polarity of the modified polyolefin resin to remain in an optimum range and the modified polyolefin resin components to be appropriately interacted with each other and with the solvent molecules in the system and other molecules, resulting in improving the solution stability.

The residual ratio is a proportion (%) of the amount of the structure (b1) in the modified polyolefin resin (X) relative to the amount of the structure (b1) in the acid-modified polyolefin resin (A) and is calculated by the following mathematical formula (1).

$$\text{Residual ratio (\%) of structure } (b1) = Ac/Aa \quad \text{Mathematical Formula (1)}$$

Aa: A value determined by dividing the area of the peak existing in the vicinity of 1,780 $cm^{-1}$ by the area of the peak existing in the vicinity of 1,450 $cm^{-1}$, which is a peak specific to polyolefin, in the infrared absorption spectrum of the acid-modified polyolefin resin (A)

Ac: A value determined by dividing the area of the peak existing in the vicinity of 1,780 $cm^{-1}$ by the area of the peak existing in the vicinity of 1,450 $cm^{-1}$, which is a peak specific to polyolefin, in the infrared absorption spectrum of the modified polyolefin resin (X)

[Chlorination]

The modified polyolefin resin (X) may be a modified chlorinated polyolefin resin (X1) or a modified non-chlorinated polyolefin resin (X2). Use of the modified chlorinated polyolefin resin (X1) allows the adherability to the non-polar resin substrate and the compatibility with other components to be further improved and excellent pigment dispersibility and hue stability to be obtained.

(Method for Chlorination)

The modified chlorinated polyolefin resin (X1) may be obtained by performing chlorination at any stage of the production. Examples of the stage for chlorination include (Case 1) chlorinating the polyolefin (a) (before the graft polymerization of the acid component (b)), (Case 2) chlorinating the resin (A) (after the graft polymerization of the acid component (b)), and (Case 3) chlorinating after modification with alcohol (B). Case 1 and Case 2 are preferable and Case 2 is more preferable. In other words, it is preferable that the resin (A) is an acid-modified chlorinated polyolefin resin (A1).

The method for chlorination may be any methods of introducing chlorine atoms into the object. Examples of the method include a method in which the object is dissolved in a solvent including water, carbon tetrachloride, or a chlorine-based solvent (for example, chloroform) and thereafter chlorine gas is blown into the object. At the time of blowing the chlorine gas, the object may be irradiated with ultraviolet rays or a radical reaction initiator may be present, if necessary. Examples of the radical reaction initiator include organic peroxide compounds (for example, the organic peroxide compounds exemplified in the above description of radical generators) and azonitriles (for example, azobisisobutyronitrile). The pressure and temperature at the time of blowing chlorine gas are not particularly limited and the pressure may be either normal pressure or pressurized pressure. The temperature is usually 50° C. to 140° C. After completion of the chlorination, usually, the chlorine-based solvent in the system is distilled off by reducing the pressure or the like or replaced with an organic solvent.

(Chlorine Content Ratio (Degree of Chlorination))

The chlorine content ratio of the modified chlorinated polyolefin resin (X1) is not particularly limited. For example, the chlorine content ratio of the acid-modified chlorinated polyolefin resin (A1) is preferably 10% by weight or more and more preferably 15% by weight or more. The upper limit is preferably 40% by weight or less and more preferably 30% by weight or less. Therefore, the chlorine content ratio of the acid-modified chlorinated polyolefin resin (A1) is preferably 10% by weight to 40% by weight and more preferably 15% by weight to 30% by weight. This allows the polarity of the modified polyolefin resin composition to be controlled within a certain range. As a result, in the case where the modified polyolefin resin composition is used in paint application together with other resin components, the compatibility with the other resin components can be excellent. In addition, the adherability of the modified polyolefin resin composition to a non-polar substrate such as a polyolefin resin can be sufficiently exhibited. The chlorine content ratio can be measured in accordance with JIS-K7229: 1995. The chlorine content ratios of the resins (X1) and (A1) usually have the same value.

[Organic Solvent (C)]

The organic solvent (C) is one of the optional components that the modified polyolefin resin composition may include in addition to the above-described modified polyolefin resin (X). Including the organic solvent (C) (hereinafter may referred to as the "solvent (C)") allows the modified polyolefin resin composition to more efficiently exhibit the effects according to the present invention in various applications as the dispersion liquid.

Examples of the solvent (C) include aromatic solvents such as toluene and xylene; ester solvents such as ethyl acetate and butyl acetate; ketone solvents such as methyl ethyl ketone, methyl butyl ketone, and ethylcyclohexane; and aliphatic or alicyclic hydrocarbon solvents such as cyclohexane, methylcyclohexane, nonane, and decane. The solvent (C) may be a single of the above organic solvent alone or a combination of two or more of the above solvents (for example, a mixed solvent).

The content of the solvent (C) (the amount relative to the resin (A)) is not particularly limited and is preferably 10% by weight to 90% by weight and more preferably 20% by weight to 80% by weight.

[Substance (D) Containing Hydroxy Group or Hydroxy Group Equivalent Structure]

The substance (D) containing a hydroxy group or a hydroxy group equivalent structure (hereinafter, may be referred to as the "substance (D)") is one of the optional components that the modified polyolefin resin composition may include in addition to the above-described modified polyolefin resin (X). Including the substance (D) allows effects such as further improvement in adherability to the substrate and prevention of deterioration in the resin component to be exhibited.

Examples of the substance containing a hydroxy group (hereinafter, may be referred to as a "substance (D-1)") include resins other than polyolefin (a) such as an acrylic resin, a polyol resin, and a polyurethane resin and the acrylic resin is preferable. The acrylic resin is preferably an acrylic resin having one hydroxy group at one end or an acrylic resin having a diol at one end and more preferably the acrylic resin having a diol at one end. The molecular weight of the acrylic resin is preferably 1,000 to 200,000 and more preferably 3,000 to 100,000. The hydroxy value of the acrylic resin is preferably 1 to 200 and more preferably 10 to 100. In addition, examples of the effects caused by including the substance (D-1) include the following effects: Improvement in adherability to the substrate; and improvement in adherability due to interaction with a topcoat in the case where the topcoat is further applied.

Examples of the substance containing a hydroxy group equivalent structure (hereinafter, may be referred to as a "substance (D-2)") include a compound containing an epoxy ring such as an epoxy-based stabilizer. Examples of the epoxy-based stabilizer include epoxy compounds having an epoxy equivalent of about 100 to about 500 and containing one or more epoxy groups in one molecule. More specifically, the following compounds are included:

Epoxidized soybean oil or epoxidized linseed oil made by epoxidizing natural vegetable oil having an unsaturated group with a peracid such as peracetic acid; epoxidized fatty acid esters made by epoxidizing unsaturated fatty acids such as oleic acid, tall oil fatty acid, and soybean oil fatty acid; epoxidized alicyclic compounds represented by epoxidized tetrahydrophthalate; compounds made by condensing bisphenol A or polyhydric alcohols with epichlorohydrin such as bisphenol A glycidyl ether, ethylene glycol glycidyl ether, propylene glycol glycidyl ether, glycerol polyglycidyl ether, and sorbitol polyglycidyl ether; and monoepoxy compounds represented by butyl glycidyl ether, 2-ethylhexyl glycidyl ether, decyl glycidyl ether, stearyl glycidyl ether, allyl glycidyl ether, phenyl glycidyl ether, sec-butylphenyl glycidyl ether, tert-butylphenyl glycidyl ether, and phenolpolyethylene oxide glycidyl ether.

In addition, the stabilizer may be a stabilizer not containing an epoxy ring. Examples of the stabilizer include metal soaps such as calcium stearate and lead stearate; organometallic compounds such as dibutyltin dilaurate and dibutylmalate; and hydrotalcite compounds, which are used as stabilizers for polyvinyl chloride resins.

Including the substance (D-2) allows hydrogen chloride generated at the time of chlorinating the polyolefin resin component to be captured and deterioration in the resin component to be prevented.

The content of the substance (D) (the amount relative to the resin (A)) is preferably 1% by weight or more, more preferably 10% by weight or more, and further preferably 30% by weight or more. The upper limit is preferably 300% by weight or less, more preferably 200% by weight or less, and further preferably 100% by weight or less. Therefore, the content of the substance (D) is preferably 1% by weight to 300% by weight, more preferably 10% by weight to 200% by weight, and further preferably 30% by weight to 100% by weight. This allows the interaction with the substrate and the topcoat to be enhanced and sufficient adherability to be secured. In the case where the modified polyolefin resin composition includes the solvent (C), the substance (D) can be excellently dispersed in the resin solution.

The substance (D) may be a single substance alone selected from the above substances (D-1) and (D-2) or a combination of two or more of the substances and preferably includes at least one of the substances (D-1) and one of the substances (D-2).

[Content of Resin (X)]

The content (solid content) of the modified polyolefin resin (X) in the modified polyolefin resin composition may be appropriately set depending on the application of the modified polyolefin resin composition and is preferably 10% by weight or more and more preferably 20% by weight or more. This allows the adherability to various substrates to be further improved. The upper limit may be 100% by weight and is preferably 90% by weight or less and more preferably 80% by weight or less.

[Optional Components]

The modified polyolefin resin composition includes at least the above-described modified polyolefin resin (X) and may further include the organic solvent (C) and the substance (D) as described above. Furthermore, optional components may be included, if necessary. Examples of the optional components include stabilizers, resins other than the modified polyolefin resin (X) (for example, the polyolefin (a), the chlorinated polyolefin resin, resins other than the polyolefin (a) and the substance (D) (for example, an alkyd resin, a polyacrylic polyol, a polyester resin, a polyester polyol, a polyether resin, a polyether polyol, and a polyurethane resin)), unreacted modification components (for example, the acid component (b), the alcohol (B), and the modification components other than the alcohol (B)), pigments, and additives (for example, ultraviolet absorbers, antioxidants, and pigment precipitation inhibitors).

[Dispersion Liquid]

The form of the modified polyolefin resin composition is not particularly limited. Examples of the form include dispersion liquids, solutions, and solids and the dispersion liquids are preferable. The dispersion liquid serving as the modified polyolefin resin composition can be obtained by heating and stirring each component constituting the composition.

[Application of Modified Polyolefin Resin Composition]

The modified polyolefin resin composition has excellent adherability and retains excellent solution properties even when the modified polyolefin resin composition is stored for a long period of time. Consequently, the modified polyolefin resin composition can be suitably used for, for example, binders (for example, binders for paints and binders for inks), primers, paints, inks, and adhesives. The binders, primers, paints, and inks including the modified polyolefin resin composition may include components in addition to the modified polyolefin resin composition (what is called additives such as antioxidants, light stabilizers, ultraviolet absorbers, pigments, dyes, and inorganic fillers), if necessary.

[Method for Producing Modified Polyolefin Resin Composition]

The above modified polyolefin resin composition can be produced by the method at least including modifying the polyolefin (a) with the $\alpha,\beta$-unsaturated carboxylic acid and the derivative (b) of the $\alpha,\beta$-unsaturated carboxylic acid having the structure (b1) derived from at least one carboxy group to give the acid-modified polyolefin resin (A), and modifying the acid-modified polyolefin resin (A) with the modification component including the alcohol (B) in an amount of 1.0 to 5.0 mol relative to 1.0 mol of the structure (b1) that the acid-modified polyolefin resin (A) has to give the modified polyolefin resin (X). Each of the raw materials and the performing conditions for modification and the like are as described in the previous sections.

The above method for producing may further include adding the organic solvent (C), the substance (D), and other components, which are added to the composition, if necessary. The timing of addition of these components is not particularly limited and any of addition at the time of modification with the acid component (b), addition at the time of modification with the alcohol (B), or addition to the modified polyolefin resin (X) may be employed. The organic solvent (C) is preferably added to the acid-modified polyolefin resin (A) at the time of modification with the alcohol (B). More preferably, the acid-modified polyolefin resin (A) is added to the organic solvent (C) to dissolve or disperse and thereafter the alcohol (B) is added. The substance (D-1) is preferably added to the acid-modified polyolefin resin (A) at the time of modification with the alcohol (B) and more preferably simultaneously added with the alcohol (B) or subsequently added after the addition of the alcohol (B). The substance (D-2) is preferably added at the process of producing the modified polyolefin resin (X) and more preferably added after acid modification or after chlorination, which is performed if necessary.

EXAMPLES

Hereinafter, the present invention will be described in detail with reference to Examples. Following Examples are examples for the purpose of suitably describing the present invention and do not limit the present invention. The methods for measuring and evaluating the physical property values and the like of Production Examples, Examples, and Comparative Examples will be described below (in the case of no description, these methods were performed in accordance with the above-described methods). In addition, "part" is weight conversion unless otherwise specified.

[Weight Average Molecular Weight (Mw) and Number Average Molecular Weight (Mn)]

The resins produced in Production Examples were measured by GPC according to the following conditions.

Equipment: HLC-8320GPC (manufactured by TOSOH CORPORATION)

Columns: TSK-gel G-6000 H×L, G-5000 H×L, G-4000 H×L, G-3000 H×L, and G-2000 H×L (manufactured by TOSOH CORPORATION)

Eluent: THF

Flow rate: 1 mL/min

Temperature: 40° C. in pump oven and column oven

Injection volume: 100 µL

Standard substance: Polystyrene EasiCal PS-1 (manufactured by Agilent Technologies Co., Ltd.)

[Content Ratio (%) of Acid Component (b1)]

The content ratio of the acid component (b1) was measured by a method in accordance with JIS K 0070: 1992 using an alkaline titration method.

[Chlorine Content Ratio (% by Weight)]

The chlorine content ratio was measured by a method in accordance with JIS-K7229: 1995.

[Evaluation of Stability of Dispersion Liquids Immediately After Preparation]

With respect to the dispersion liquids having a solid content of the resin components prepared in Examples and Comparative Examples of 50%, solution properties immediately after preparation were visually evaluated and the results were classified into the following A to D. In the case where the result is A to C, the dispersion liquid can be determined to have no practical problem.

A: No thickening or separation of the solution is confirmed and the color tone is transparent.

B: No thickening or separation of the solution is observed but the solution is slightly turbid.

C: No separation of the solution is observed but the solution is obviously turbid.

D: The solution separates into two phases or thickens significantly, or agglomerates are visually observed.

[Residual Ratio of Structure Represented by Formula: —(C=O)—O—(C=O)—]

The infrared absorption spectrum of acid-modified polyolefin obtained in each Production Example was measured. The peak existing in the vicinity of 1,780 $cm^{-1}$ was determined to be the peak specific to the structure. The value obtained by dividing the area of this peak by the area of the peak existing in the vicinity of 1,450 $cm^{-1}$ specific to the polyolefin was determined to be Aa. Subsequently, the infrared absorption spectrum of the dispersion liquid (1 hour after the addition of alcohol (B)) obtained in each Example was measured and thereafter the value Ac was determined by the same operation as Aa. The values Aa and Ac were substituted into the following mathematical formula (1) to determine the residual ratio of the structure.

Residual ratio=$Ac/Aa$×100 (%)    Mathematical Formula (1)

[Evaluation of Storage Stability of Dispersion Liquids]

The dispersion liquids determined to be A to C in the evaluation test of the stability of the dispersion liquids immediately after preparation were subjected to this test. The dispersion liquids having a solid content of the resin components prepared in Examples and Comparative Examples of 50% were stored at 40° C. for one month and thereafter the solution properties were visually evaluated in a similar manner. In the case where the evaluation result is A to C, the dispersion liquid can be determined to have no practical problem.

A: No thickening or separation of the solution is confirmed and the appearance is the same as the appearance immediately after the preparation.

B: No thickening or separation of the solution is observed but the solution is slightly thickened as compared with the appearance immediately after the preparation.

C: No separation of the solution is observed but the solution is obviously thickened as compared with the appearance immediately after the preparation.

D: The solution separates into two phases or thickens significantly, or agglomerates are visually observed.

The dispersion liquids that were determined to have no practical problem in this test were subjected to an adherability test.

[Preparation of Test Specimen]

The surface of an ultra-high rigidity polypropylene plate was degreased with isopropyl alcohol. The dispersion liquid of the resin component was spray-applied to the plate so that the dry coating film had a thickness of 10 μm to 15 μm and the applied dispersion liquid was preheated at a temperature of the melting point of the resin component plus 15° C. for 5 minutes. Subsequently, 1K Base (1K coating for base coat) including the resin component was spray-applied. The sample was allowed to stand for 10 minutes and thereafter 2K Clear (2K coating for base coat) was applied. Thereafter, the sample was subjected to a baking process at a temperature of the melting point of the resin component plus 15° C. for 30 minutes to prepare a test specimen. The following adherability test was performed using this test specimen.

[Adherability Test]

Linear notches that reached the base material were made vertically and horizontally on the coating film of the test specimen at 1 mm intervals to form 100 sections (a grid). A cellophane adhesive tape was tightly attached onto the sections and peeled off in the 180° direction. The operation in which the cellophane adhesive tape was tightly attached and peeled off was performed 10 times for the same 100 sections and the adherability (the adhesion property) was evaluated in accordance with the following criteria. In the case where the number of peeled coating film sections is 50 or less (that is, A to C evaluation), the coating film can be determined to have no practical problem.

A: No peeled coating film exists.

B: The number of the sections of the peeled coating film is 1 or more and 10 or less.

C: The number of the sections of the peeled coating film is more than 10 and 50 or less.

D: More than 50 sections of the peeled coating film exist.

[Dispersion of Pigments and Preparation of Pigment-Blended Paints]:

Into a batch type SG mill, 40 parts of the dispersion liquid having a solid content of the resin component prepared in Examples and Comparative Examples of 50%, 20 parts of a pigment, 10 parts of xylene, 10 parts of butyl acetate, and glass beads having the same volume as the volume of the resin component were charged and the mixture was dispersed for 4 hours (60 mm impeller, 2,000 rpm). Furthermore, 20 parts of an acrylic resin was blended and the resultant mixture was stirred with a disperser to prepare a pigment-blended paint (blue, yellow, red, and white). Table 3 lists the breakdown of the resin components and pigments used. The details of the pigments and the acrylic resin are as follows.

Blue pigment: fastogen (registered trademark) Blue 5480 (manufactured by Dainippon Ink and Chemicals, Inc.)

Yellow pigment: HOSTAPERM YELLOW H3g (manufactured by Clariant AG)

Red pigment: Irgazine (registered trademark) DPP Red BO (manufactured by Ciba Specialty Chemicals Inc.)

White pigment: Titanium oxide R-820 (manufactured by ISHIHARA SANGYO KAISHA, LTD.)

Acrylic resin: Dianal (registered trademark) BR-116 (manufactured by MITSUBISHI RAYON CO., LTD.)

The prepared pigment-blended paints (blue, yellow, red, white) were evaluated for pigment dispersibility and hue stability by the following methods.

[Pigment Dispersibility of Pigment-Blended Paints]:

After the obtained paints were stored at room temperature for 3 days, the separated state of the pigment was visually observed. In addition, the pigment dispersibility was evaluated according to the following evaluation criteria using a grind meter in accordance with the JIS K-5600-2-5 dispersity test. In the case where the pigment component is dispersed in less than 10 μm (that is, in the case of A to C evaluation), the paint can be determined to have no practical problem.

A: The pigment is uniformly dispersed in the paint and the color tone is the same as the color tone immediately after preparation.

B: The pigment is uniformly dispersed in the paint but shadow (haze) is confirmed in the paint when the paint is shaken.

C: The pigment component is dispersed in a size measured with a grind meter of less than 10 μm.

D: The pigment component has a size measured with a grind meter of 10 μm or more.

[Hue Stability of Pigment-Blended Paint]:

The pigment-blended paint was stored at room temperature for 3 days and thereafter applied to a tin plate with an 8-mil doctor blade and dried at 60° C. for 3 minutes. The color of the dried product was measured with a digital color meter (manufactured by Suga Test Instruments Co., Ltd.). From this value and the initial value before storage, ΔE was determined. In the case where the value of ΔE is 10 or less (that is, A to C evaluation), the paint can be determined to have no practical problem.

A: The value of ΔE is 0.5 or less.

B: The value of ΔE is higher than 0.5 and 2 or lower.

C: The value of ΔE is higher than 2 and 10 or lower.

D: The value of ΔE is higher than 10.

Production Example 1

Production of Acid-Modified Chlorinated Polyolefin Resin (A-1)

As the polyolefin (a), 100 parts of the propylene-based random copolymer (content ratio of propylene structural unit: 96% by weight and content ratio of ethylene structural unit: 4% by weight) produced using a metallocene catalyst as the polymerization catalyst, 10 parts of maleic anhydride as the α,β-unsaturated carboxylic acid cyclic anhydride, and 2 parts of di-t-butylperoxide as the radical generator were uniformly mixed and the mixture was fed to a twin-screw extruder (L/D=60, diameter=15 mm, first to fourteenth barrels).

Reaction was performed under conditions of a residential time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels). Thereafter, reduced pressure treatment was performed for removing unreacted maleic anhydride to give an acid-modified polyolefin (ethylene-propylene) resin modified with maleic anhydride.

Into a glass-lined reaction vessel, 100 parts of the acid-modified polyolefin resin was charged. Chloroform was added and the resin was sufficiently dissolved at a temperature of 110° C. under a pressure of 2 kgf/cm$^2$. Thereafter, 2 parts of azobisisobutyronitrile as the radical generator was added and chlorine gas was blown while the pressure in the vessel was being controlled to 2 kgf/cm$^2$ to perform chlorination.

After completion of the reaction, 6 parts of an epoxy compound (Eposizer W-100EL, manufactured by Dainippon Ink and Chemicals, Inc.) as the substance (D) (stabilizer) containing a hydroxy group or a hydroxy group equivalent structure was added. The mixture was fed to an extruder with a vent equipped with a suction part for solvent removal at the screw shaft portion. The solvent was removed and the resultant product was solidified to give an acid-modified chlorinated polyolefin resin (A-1). The obtained acid-modified chlorinated polyolefin resin (A-1) had a weight average molecular weight of 50,000, a maleic anhydride content ratio of 5% by weight, and a chlorine content ratio of 20% by weight.

Production Example 2

Production of Acid-Modified Chlorinated Polyolefin Resin (A-2)

100 parts of the propylene-based random copolymer as the polyolefin (a) (content ratio of propylene structural unit: 96% by weight and content ratio of ethylene structural unit: 4% by weight) produced using a metallocene catalyst as the polymerization catalyst, 15 parts of maleic anhydride as the α,β-unsaturated carboxylic acid cyclic anhydride, and 2 parts of di-t-butylperoxide as the radical generator were uniformly mixed and the mixture was fed to a twin-screw extruder (L/D=60, diameter=15 mm, first to fourteenth barrels).

Reaction was performed under conditions of a residential time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels). Thereafter, reduced pressure treatment was performed for removing unreacted maleic anhydride to give an acid-modified polyolefin (ethylene-propylene) resin modified with maleic anhydride.

Into a glass-lined reaction vessel, 100 parts of the acid-modified polyolefin resin was charged. Chloroform was added and the resin was sufficiently dissolved at a temperature of 110° C. under a pressure of 2 kgf/cm$^2$. Thereafter, 2 parts of azobisisobutyronitrile as the radical generator was added and chlorine gas was blown while the pressure in the vessel was being controlled to 2 kgf/cm$^2$ to perform chlorination.

After completion of the reaction, 6 parts of an epoxy compound (Eposizer W-100EL, manufactured by Dainippon Ink and Chemicals, Inc.) as the substance (D) (stabilizer) containing a hydroxy group or a hydroxy group equivalent structure was added. The mixture was fed to an extruder with a vent equipped with a suction part for solvent removal at the screw shaft portion. The solvent was removed and the resultant product was solidified to give an acid-modified chlorinated polyolefin resin (A-2). The obtained acid-modified chlorinated polyolefin resin (A-2) had a weight average molecular weight of 10,000, a maleic anhydride content ratio of 10% by weight, and a chlorine content ratio of 10% by weight.

Production Example 3

Production of Acid-Modified Chlorinated Polyolefin Resin (A-3)

100 parts of the propylene-based random copolymer as the polyolefin (a) (content ratio of propylene structural unit: 96% by weight and content ratio of ethylene structural unit: 4% by weight) produced using a metallocene catalyst as the polymerization catalyst, 3 parts of maleic anhydride as the α,β-unsaturated carboxylic acid cyclic anhydride, and 2 parts of di-t-butylperoxide as the radical generator were uniformly mixed and the mixture was fed to a twin-screw extruder (L/D=60, diameter=15 mm, first to fourteenth barrels).

Reaction was performed under conditions of a residential time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels). Thereafter, reduced pressure treatment was performed for removing unreacted maleic anhydride to give an acid-modified polyolefin (ethylene-propylene) resin modified with maleic anhydride.

Into a glass-lined reaction vessel, 100 parts of the acid-modified polyolefin resin was charged. Chloroform was added and the resin was sufficiently dissolved at a temperature of 110° C. under a pressure of 2 kgf/cm$^2$. Thereafter, 2 parts of azobisisobutyronitrile as the radical generator was added and chlorine gas was blown while the pressure in the vessel was being controlled to 2 kgf/cm$^2$ to perform chlorination.

After completion of the reaction, 6 parts of an epoxy compound (Eposizer W-100EL, manufactured by Dainippon Ink and Chemicals, Inc.) as the substance (D) (stabilizer) containing a hydroxy group or a hydroxy group equivalent structure was added. The mixture was fed to an extruder with a vent equipped with a suction part for solvent removal at the screw shaft portion. The solvent was removed and the resultant product was solidified to give an acid-modified chlorinated polyolefin resin (A-3). The obtained acid-modified chlorinated polyolefin resin (A-3) had a weight average molecular weight of 200,000, a maleic anhydride content ratio of 1% by weight, and a chlorine content ratio of 30% by weight.

Production Example 4

Production of Acid-Modified Polyolefin Resin (A-4)

100 parts of a propylene-based random copolymer as the polyolefin (a) (content ratio of propylene structural unit:

96% by weight and content ratio of ethylene structural unit: 4% by weight) produced using a metallocene catalyst as the polymerization catalyst, 10 parts of maleic anhydride as the α,β-unsaturated carboxylic acid cyclic anhydride, and 2 parts of di-t-butylperoxide as the radical generator were uniformly mixed and the mixture was fed to a twin-screw extruder (L/D=60, diameter=15 mm, first to fourteenth barrels).

Reaction was performed under conditions of a residential time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels). Thereafter, reduced pressure treatment was performed for removing unreacted maleic anhydride to give an acid-modified polyolefin (ethylene-propylene) resin modified with maleic anhydride.

After completion of the reaction, 6 parts of an epoxy compound (Eposizer W-100EL, manufactured by Dainippon Ink and Chemicals, Inc.) as the substance (D) (stabilizer) containing a hydroxy group or a hydroxy group equivalent structure was added. The mixture was fed to an extruder with a vent equipped with a suction part for solvent removal at the screw shaft portion. The solvent was removed and the resultant product was solidified to give an acid-modified polyolefin resin (A-4). The obtained acid-modified polyolefin resin (A-4) had a weight average molecular weight of 50,000 and a maleic anhydride content ratio of 5% by weight Production Example 5

Production of Chlorinated Polyolefin Resin (A-5)

100 parts of the propylene-based random copolymer as the polyolefin (a) (content ratio of propylene structural unit: 96% by weight and content ratio of ethylene structural unit: 4% by weight) produced using a metallocene catalyst as the polymerization catalyst and 2 parts of di-t-butylperoxide as the radical generator were uniformly mixed and the mixture was fed to a twin-screw extruder (L/D=60, diameter=15 mm, first to fourteenth barrels).

Reaction was performed under conditions of a residential time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels) to give a polyolefin (ethylene-propylene) resin.

The polyolefin resin was charged into a glass-lined reaction vessel. Chloroform was added and the resin was sufficiently dissolved at a temperature of 110° C. under a pressure of 2 kgf/cm$^2$. Thereafter, 2 parts of azobisisobutyronitrile as the radical generator was added and chlorine gas was blown while the pressure in the vessel was being controlled to 2 kgf/cm$^2$ to perform chlorination.

After completion of the reaction, 6 parts of an epoxy compound (Eposizer W-100EL, manufactured by Dainippon Ink and Chemicals, Inc.) as the substance (D) (stabilizer) containing a hydroxy group or a hydroxy group equivalent structure was added. The mixture was fed to an extruder with a vent equipped with a suction part for solvent removal at the screw shaft portion. The solvent was removed and the resultant product was solidified to give a chlorinated polyolefin resin (A-5) as a chlorinated polypropylene resin. The obtained chlorinated polyolefin resin (A-5) had a weight average molecular weight of 50,000 and a chlorine content ratio of 20% by weight.

Production Example 6

Production of Polyolefin Resin (A-6)

100 parts of the propylene-based random copolymer as the polyolefin (a) (content ratio of propylene structural unit: 96% by weight and content ratio of ethylene structural unit: 4% by weight) produced using a metallocene catalyst as the polymerization catalyst and 2 parts of di-t-butylperoxide as the radical generator were uniformly mixed and the mixture was fed to a twin-screw extruder (L/D=60, diameter=15 mm, first to fourteenth barrels).

Reaction was performed under the conditions of a residential time of 10 minutes, a rotation speed of 200 rpm, and barrel temperatures of 100° C. (first and second barrels), 200° C. (third to eighth barrels), 90° C. (ninth and tenth barrels), and 110° C. (eleventh to fourteenth barrels) to give a polyolefin (ethylene-propylene) resin.

After completion of the reaction, 6 parts of an epoxy compound (Eposizer W-100EL, manufactured by Dainippon Ink and Chemicals, Inc.) as the substance (D) (stabilizer) containing a hydroxy group or a hydroxy group equivalent structure was added. The mixture was fed to an extruder with a vent equipped with a suction part for solvent removal at the screw shaft portion. The solvent was removed and the resultant product was solidified to give a polyolefin resin (A-6). The obtained polyolefin resin (A-6) had a weight average molecular weight of 50,000.

TABLE 1

| | Acid-modified polyolefin resin (A) | | |
| --- | --- | --- | --- |
| Number | Weight average molecular weight | Content of acid component | Degree of chlorination |
| A-1 | 50,000 | 5% by weight | 20% by weight |
| A-2 | 10,000 | 10% by weight | 10% by weight |
| A-3 | 200,000 | 1% by weight | 30% by weight |
| A-4 | 50,000 | 5% by weight | — |
| A-5 | 50,000 | — | 20% by weight |
| A-6 | 50,000 | — | — |

Example 1

Production of Dispersion Liquid of Resin Component (X-1)

In 48 parts of toluene as the organic solvent (C), 40 parts of the acid-modified chlorinated polyolefin resin (A-1) obtained in Production Example 1 was dissolved, 2 parts of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-1) having a solid content of 50% by weight.

Example 2

Production of Dispersion Liquid of Resin Component (X-2)

In 38 parts of butyl acetate as the organic solvent (C), 40 parts of the acid-modified chlorinated polyolefin resin (A-2)

obtained in Production Example 2 was dissolved, 12 parts of 1-propanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-2) having a solid content of 50% by weight.

Example 3

Production of Dispersion Liquid of Resin Component (X-3)

In 49.6 parts of xylene as the organic solvent (C), 40 parts of the acid-modified chlorinated polyolefin resin (A-3) obtained in Production Example 3 was dissolved, 0.4 part of ethanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-3) having a solid content of 50% by weight.

Example 4

Production of Dispersion Liquid of Resin Component (X-4)

In 48 parts of toluene as the organic solvent (C), 40 parts of the acid-modified polyolefin resin (A-4) obtained in Production Example 4 was dissolved, 2 parts of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-4) having a solid content of 50% by weight.

Comparative Example 1

Production of Dispersion Liquid of Resin Component (X-5)

In 48 parts of toluene as the organic solvent (C), 40 parts of the acid-modified chlorinated polyolefin resin (A-5) obtained in Production Example 5 was dissolved, 2 parts of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-5) having a solid content of 50% by weight.

Comparative Example 2

Production of Dispersion Liquid of Resin Component (X-6)

In 48 parts of water as a solvent (C'), 40 parts of the acid-modified chlorinated polyolefin resin (A-1) obtained in Production Example 1 was dispersed, 2 parts of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-6) having a solid content of 50% by weight.

Comparative Example 3

Production of Dispersion Liquid of Resin Component (X-7)

In 50 parts of toluene as the organic solvent (C), 40 parts of the acid-modified chlorinated polyolefin resin (A-1) obtained in Production Example 1 was dissolved, and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-7) having a solid content of 50% by weight.

Comparative Example 4

Production of Dispersion Liquid of Resin Component (X-8)

In 48 parts of toluene as the organic solvent (C), 40 parts of the acid-modified chlorinated polyolefin resin (A-1) obtained in Production Example 1 was dissolved, 2 parts of 2-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-8) having a solid content of 50% by weight.

Comparative Example 5

Production of Dispersion Liquid of Resin component (X-9))

In 48 parts of toluene as the organic solvent (C), 40 parts of the acid-modified chlorinated polyolefin resin (A-1) obtained in Production Example 1 was dissolved, 2 parts of 1-pentanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-9) having a solid content of 50% by weight.

Comparative Example 6

Production of Dispersion Liquid of Resin Component (X-10))

In 48 parts of toluene as the organic solvent (C), 40 parts of the acid-modified chlorinated polyolefin resin (A-1)

obtained in Production Example 1 was dissolved, 2 parts of methanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-10) having a solid content of 50% by weight.

Comparative Example 7

Production of Dispersion Liquid of Resin Component (X-11)

In 48 parts of toluene as the organic solvent (C), 40 parts of the polyolefin resin (A-6) obtained in Production Example 6 was dissolved, 2 parts of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57 ±2) as the substance (D) containing a hydroxy group or a hydroxy group equivalent structure was added. The resultant mixture was heated and stirred to give the dispersion liquid of the resin component (X-11) having a solid content of 50% by weight.

Comparative Example 8

Production of Dispersion Liquid of Resin Component (X-12)

In 49.8 parts of toluene as the organic solvent (C), 40 parts of the acid-modified chlorinated polyolefin resin (A-1) obtained in Production Example 1 was dissolved, 0.2 part of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-12) having a solid content of 50% by weight.

Comparative Example 9

Production of Dispersion Liquid of Resin Component (X-13))

In 43.8 parts of toluene as the organic solvent (C), 40 parts of the acid-modified chlorinated polyolefin resin (A-1) obtained in Production Example 1 was dissolved, 6.2 parts of 1-butanol as the alcohol (B) was added and 10 parts of an acrylic resin (Actflow (registered trademark) UT-1001, manufactured by Soken Chemical & Engineering Co., Ltd., molecular weight 3,500, hydroxy value 57±2) as the substance (D) containing a hydroxy group or a hydroxy group equivalent structure was added. The resultant mixture was heated and stirred to give the dispersion liquid of the resin component (X-13) having a solid content of 50° by weight.

TABLE 2

| | | | | | | | |
|---|---|---|---|---|---|---|---|
| Compositions in Examples and Comparative Examples | | | | | | | |
| Number | Resin (A) | Solvent (C) | Alcohol (B) | Content of substance (D-2) in resin (A) | Blend ratio (weight ratio) of A/C/B/D-1 | Added amount (mol) of alcohol (B) relative to 1 mol of —(C=O)—O—(C=)— | Residual amount of —(C=O)—O—(C=)— |
| Example 1 | A-1 | Toluene | 1-Butanol | 5.7% by weight | 40/48/2/10 | 1.3 | 20% |
| Example 2 | A-2 | Butyl acetate | 1-Propanol | 5.7% by weight | 40/38/12/10 | 4.9 | 5% |
| Example 3 | A-3 | Xylene | Ethanol | 5.7% by weight | 40/49.5/0.4/10 | 2.1 | 15% |
| Example 4 | A-4 | Toluene | 1-Butanol | 5.7% by weight | 40/48/2/10 | 1.3 | 50% |
| Comparative Example 1 | A-5 | Toluene | 1-Butanol | 5.7% by weight | 40/48/2/10 | — | — |
| Comparative Example 2 | A-1 | Water | 1-Butanol | 5.7% by weight | 40/48/2/10 | 1.3 | 0% |
| Comparative Example 3 | A-1 | Toluene | — | 5.7% by weight | 40/50/0/10 | 0.0 | 100% |
| Comparative Example 4 | A-1 | Toluene | 2-Butanol | 5.7% by weight | 40/48/2/10 | 1.3 | 55% |
| Comparative Example 5 | A-1 | Toluene | 1-Pentanol | 5.7% by weight | 40/48/2/10 | 1.1 | 70% |
| Comparative Example 6 | A-1 | Toluene | Methanol | 5.7% by weight | 40/48/2/10 | 3.1 | 60% |
| Comparative Example 7 | A-6 | Toluene | 1-Butanol | 5.7% by weight | 40/48/2/10 | — | — |
| Comparative Example 8 | A-1 | Toluene | 1-Butanol | 5.7% by weight | 40/49.8/0.2/10 | 0.1 | 88% |
| Comparative Example 9 | A-1 | Toluene | 1-Butanol | 5.7% by weight | 40/43.8/0.2/10 | 5.1 | 20% |

The stability of the dispersion liquids of each Example and Comparative Example was evaluated and, at the same time, test specimens were prepared and the adherability test was confirmed. In addition, paints were prepared by mixing the dispersion liquid, the pigment, and a compatibilizer, and the pigment dispersibility and hue stability were also evaluated. The evaluation results are listed in Table 3.

TABLE 3

Test results of Examples or Comparative Examples

| Number | Solution property immediately after preparation | Storage stability | Adherability | Pigment dispersibility | | | | Hue stability | | | |
|---|---|---|---|---|---|---|---|---|---|---|---|
| | | | | Red | Blue | Yellow | White | Red | Blue | Yellow | White |
| Example 1 | A | A | A | A | A | A | A | A | A | A | A |
| Example 2 | A | B | A | A | A | A | A | A | A | A | A |
| Example 3 | A | B | A | C | C | C | B | C | C | C | B |
| Example 4 | B | B | C | A | A | A | A | A | A | A | A |
| Comparative Example 1 | B | D | — | — | — | — | — | — | — | — | — |
| Comparative Example 2 | D | — | — | — | — | — | — | — | — | — | — |
| Comparative Example 3 | A | D | — | — | — | — | — | — | — | — | — |
| Comparative Example 4 | A | D | — | — | — | — | — | — | — | — | — |
| Comparative Example 5 | B | D | — | — | — | — | — | — | — | — | — |
| Comparative Example 6 | C | D | — | — | — | — | — | — | — | — | — |
| Comparative Example 7 | C | A | — | — | — | — | — | — | — | — | — |
| Comparative Example 8 | A | D | D | D | D | D | D | D | D | D | D |
| Comparative Example 9 | D | — | — | — | — | — | — | — | — | — | — |

From the results of the above tests, it is found that the resin compositions obtained in Examples by adding the alcohol in the corresponding range to the dispersion liquids obtained by dispersing the acid-modified polyolefin resin in the organic solvent have excellent solution properties immediately after preparation, demonstrate no significant thickening even after one month, and exhibit excellent adherability to the substrate, pigment dispersibility, and hue stability as compared with the compositions in Comparative Examples.

The invention claimed is:

1. A modified polyolefin resin composition, comprising:
a modified polyolefin resin (X) formed by modifying an acid-modified polyolefin resin (A) with a modification component comprising an alcohol (B), the alcohol (B) comprising ethanol, 1-propanol, and/or 1-butanol,
wherein the modified polyolefin resin composition satisfies (I) to (III):
(I) the acid-modified polyolefin resin (A) is a modified polyolefin (a) comprising, in polymerized form, an α,β-unsaturated carboxylic acid anhydride (b) having a structure (b1) comprising a —(C=O)—O—(C=O)— structure;
(II) a residual ratio of the structure (b1) in the modified polyolefin resin (X) is in a range of from more than 0% to 50% or less; and
(III) the modified polyolefin resin composition comprises the alcohol (B) in a range of from 1.2 to 5.0 mol relative to 1.0 mol of the structure (b1) in the acid-modified polyolefin resin (A).

2. The composition of claim 1, wherein the α,β-unsaturated carboxylic acid anhydride is an α,β-unsaturated polycarboxylic acid cyclic anhydride.

3. The composition of claim 1, wherein the modified polyolefin resin (X) is a modified chlorinated polyolefin resin (X1).

4. The composition of claim 1, wherein the acid-modified polyolefin resin (A) is an acid-modified chlorinated polyolefin resin (A1).

5. The composition of claim 1, further comprising:
a molecule (D) comprising a hydroxy group or a hydroxy group equivalent structure.

6. The composition of claim 1, wherein the alcohol (B) comprises the ethanol.

7. The composition of claim 1, wherein the alcohol (B) comprises the 1-propanol.

8. The composition of claim 1, further comprising:
an organic solvent (C).

9. The composition of claim 1, wherein the acid-modified polyolefin resin (A) comprises the α,β-unsaturated carboxylic acid and the derivative (b), together, in a range of from 0.5 to 20% by weight.

10. The composition of claim 1, wherein the acid-modified polyolefin resin (A) has a weight average molecular weight in a range of from 5,000 to 300,000.

11. The composition of claim 1, wherein the alcohol (B) comprises the 1-butanol.

12. The composition of claim 1, further comprising:
a substance (D-1) comprising an acrylic resin, a polyol resin, and/or a polyurethane resin, the substance (D-1) comprising a hydroxy group.

13. The composition of claim 1, wherein the polyolefin (a) comprises propylene structural unit in a content ratio of 60% by weight or more.

14. The composition of claim 1, wherein the residual ratio of the structure (1) in the modified polyolefin resin (X) is in a range of from 2 to 50% or less.

15. The composition of claim 1, wherein the residual ratio of the structure (b1) in the modified polyolefin resin (X) is in a range of from 5 to 50% or less.

16. The composition of claim 1, wherein the α,β-unsaturated carboxylic acid anhydride comprises maleic anhydride.

17. A primer, comprising:
the modified polyolefin resin composition of claim 1.

18. A paint, comprising:
the modified polyolefin resin composition of claim 1.

19. An ink, comprising:
the modified polyolefin resin composition of claim 1.

20. A method for producing the modified polyolefin resin composition of claim 1, the method comprising:
modifying the polyolefin (a) with the α,β-unsaturated carboxylic acid anhydride (b) to give the acid-modified polyolefin resin (A); and
modifying the acid-modified polyolefin resin (A) with the modification component comprising the alcohol (B) in a range of from 1.2 to 5.0 mol, relative to mol of the structure (b1), to obtain the modified polyolefin resin (X).

* * * * *